(12) United States Patent
Stebbing

(10) Patent No.: US 7,393,379 B2
(45) Date of Patent: Jul. 1, 2008

(54) METHODS OF USING TIRES AND SCRAP RUBBER IN THE MANUFACTURE AND MELTING OF STEEL AND OTHER METALS

(76) Inventor: Franklin Leroy Stebbing, 607 N. 12th St., Norfolk, NE (US) 68701

( * ) Notice: Subject to any disclaimer, the term of this patent is extended or adjusted under 35 U.S.C. 154(b) by 0 days.

(21) Appl. No.: 11/108,950

(22) Filed: Apr. 19, 2005

(65) Prior Publication Data

US 2005/0229743 A1    Oct. 20, 2005

Related U.S. Application Data

(60) Provisional application No. 60/563,701, filed on Apr. 20, 2004.

(51) Int. Cl.
*C22B 9/00* (2006.01)
(52) U.S. Cl. .......................................... 75/581
(58) Field of Classification Search ................ 75/10.61, 75/403, 581
See application file for complete search history.

(56) References Cited

U.S. PATENT DOCUMENTS

| | | | | |
|---|---|---|---|---|
| 2,382,534 | A | * | 8/1945 | Baily ........................ 75/10.38 |
| 3,385,494 | A | * | 5/1968 | Themelis et al. ............. 75/10.5 |
| 3,665,848 | A | | 5/1972 | Kimura et al. |
| 3,681,049 | A | * | 8/1972 | Celada et al. .............. 75/10.58 |
| 3,785,784 | A | | 1/1974 | Tezuka |

(Continued)

FOREIGN PATENT DOCUMENTS

EP    0747492    11/1996

(Continued)

OTHER PUBLICATIONS

English Abstract of JP 59-133309.*

(Continued)

*Primary Examiner*—Roy King
*Assistant Examiner*—Tima M McGuthry-Banks
(74) *Attorney, Agent, or Firm*—Banner & Witcoff, Ltd.

(57) ABSTRACT

A method of using scrap rubber, such as tires or parts of tires, to manufacture or melt steel and other metals includes inserting into a furnace at a more precise and controlled rate, time, and location the scrap rubber. The controlled rate of insertion into the furnace, as opposed to batch feeding them, permits the use of larger quantities of scrap rubber. The net benefit includes reducing the amount of scrap rubber, such as tires, to be sent to a waste disposal facility or landfill, thereby improving the environment. In addition, by increasing the use of scrap rubber as a source of energy for steel or the metal production, less energy is required from other sources. The invention further allows the scrap rubber to be put into the furnace separate from the scrap metal that is also to be put into the furnace, thereby eliminating the known methods and techniques of combining of the scrap rubber with the steel or scrap metal prior to the placement of the scrap rubber and scrap metal into the furnace. The invention further allows the carbon monoxide that is being formed by the foamy slag process in the furnace to convert to carbon dioxide with additional heat generation inside of the furnace—a result of the catalytic effect of the tires.

25 Claims, 1 Drawing Sheet

U.S. PATENT DOCUMENTS

| | | | |
|---|---|---|---|
| 3,812,620 A | | 5/1974 | Titus et al. |
| 4,014,681 A | * | 3/1977 | Rhinehart ................... 75/10.38 |
| 4,103,610 A | | 8/1978 | Vezzani |
| 5,322,544 A | | 6/1994 | Stebbing |
| 5,380,352 A | * | 1/1995 | Greenwalt ................... 75/445 |
| 6,264,883 B1 | * | 7/2001 | Dimitrov et al. ............ 266/227 |
| 6,638,337 B1 | * | 10/2003 | Bray et al. ................... 75/533 |
| 2003/0066387 A1 | * | 4/2003 | Stebbing ................... 75/10.61 |

FOREIGN PATENT DOCUMENTS

| | | | | |
|---|---|---|---|---|
| JP | 57131306 A | * | 8/1982 | |
| JP | 59-133309 | * | 7/1984 | |
| JP | 59133309 A | * | 7/1984 | |
| JP | 02-217788 | * | 8/1990 | |
| JP | 2000-192161 | * | 7/2000 | |

OTHER PUBLICATIONS

English abstract and machine translation of JP 2000-192161.*
United States Steel (USS), The Making, Shaping, and Treating of Steel, 10th Edition, 1985 (pp. 634-635).*
English Abstract of JP 02-217788.*
English translation of Japanese patent 59-133309, translation Apr. 2006, patent publication date in Japanese Jul. 31, 1984.*
English translation of Japanese patent 2000-192161, translation date Apr. 28, 2006, patent publication date Jul. 11, 2000.*
Metals Handbook, Desk Edition, 2$^{nd}$ Edition, ASM International, 1998, p. 1186.*
Derwent Acc No. 1982-80128E abstract of JP 57131306 A and JP 88003923B published Feb. 7, 1981.*
English abstract of JP 59133309A published Jul. 31, 1984.*

* cited by examiner

METHODS OF USING TIRES AND SCRAP RUBBER IN THE MANUFACTURE AND MELTING OF STEEL AND OTHER METALS

CROSS REFERENCE TO RELATED APPLICATION

This Non-Provisional Application claims benefit to U.S. Provisional Application Ser. No. 60/563,701 filed Apr. 20, 2004.

FIELD OF THE INVENTION

The invention relates generally to the melting of scrap metal in a furnace using rubber tires, or parts of rubber tires, as an additional energy source. The invention also relates generally to the inclusion of rubber tires, or parts of rubber tires, as a carbon component for the making of steel and other metals.

BACKGROUND OF THE INVENTION

It is known to use scrap tires, or parts of tires, as a supplemental fuel source and carbon source for steel melting in an electric arc furnace. The techniques and methods of such use are described in U.S. Pat. No. 5,322,544 and U.S. patent application Ser. No. 09/974,199, both of which are in the name of Franklin Leroy Stebbing and both of which are incorporated herein by reference in their entirety. As described in U.S. Pat. No. 5,322,544, recycling scrap tires into steel or using them as a heat source improves the environment by removing the tires from landfills where they do not degrade but do create a fire hazard. Additionally, a single scrap tire, weighing about 20 pounds, has about the same heating value of coke, approximately 15,000 BTU's per pound, or approximately, 300,000 BTU's per tire. In the manufacture of steel, scrap tires, which are so plentiful that they have a near zero cost, can be used as a substitute to coal or coke as the heating source, thereby significantly reducing the costs to manufacture the steel. As described in U.S. patent application Ser. No. 09/974,199, the scrap tires can be bundled with scrap steel in a charging bucket and then the contents of the bucket placed in the furnace where the bundled tires and scrap steel are recycled into steel. The present invention described herein builds upon the known techniques and methods of using scrap tires or scrap rubber in the manufacture of steel, as set forth in U.S. Pat. No. 5,322,544 and U.S. patent application Ser. No. 09/974,199.

BRIEF SUMMARY OF THE INVENTION

The present invention provides a system that permits the use of the many forms of tires and scrap rubber in the furnace. The invention allows the tires to be inserted into the furnace at a more precise and controlled rate, time, and location. To this end, for example, by inserting the tires at a slower rate into the furnace and separate from the scrap steel, as compared to batch feeding them or feeding them as tires and scrap steel bundles, it is possible to use larger quantities of tires at a specific controlled location and time. In an exemplary application, four tires or the equivalent of four tires may be added per ton of steel to be produced, as compared to two tires per ton ordinarily expected. A benefit with the increase in the amount of tires that can be used is the decrease in the number and amount of tires to be sent to a waste tire disposal facility or landfill, thereby improving the environment, and putting more scrap tires to beneficial use. In addition, by increasing the use of tires as a source of energy for steel or the metal production, less energy is required from other sources for such steel or metal production.

The invention further allows the use of tires in many forms, so that the tires can be more readily handled and stored before they are put into the furnace. Also, the present invention allows the tires to be put into the furnace separate from the scrap metal that is also to be put into the furnace. Unlike previous methods and techniques, the invention does not require the combining of the tires with the steel or scrap metal prior to the placement of the tires and scrap metal into the furnace. By eliminating the tires from the charge bucket, more available space for the scrap metal is created in the charge bucket. This can be especially valuable in some melt shops where headroom or other factors limit charge bucket size. Also, it is no longer necessary to transport the charging buckets to a location where the tires are stored, as is the case in many electric arc furnace shops.

The invention also allows the tires to be injected into the furnace at very elevated temperatures, thereby increasing the efficiency of the combustion of the tires.

Moreover, the invention allows the tires to be injected into the furnace continuously and in a location most advantageous, such as while a foamy slag process is taking place. This allows the carbon monoxide that is being formed by the foamy slag process to convert to carbon dioxide with additional heat generation inside of the furnace—a result of the catalytic effect of the tires. With the invention, the tires may be placed or injected into the molten metal bath in the furnace so as to increase the carbon level in the liquid steel or metal to the desired level for the type and grade being produced.

Other features and advantages of the invention will become apparent to those skilled in the art upon review of the following detailed description, claims and drawings in which like numerals are used to designate like features.

Figure 1:
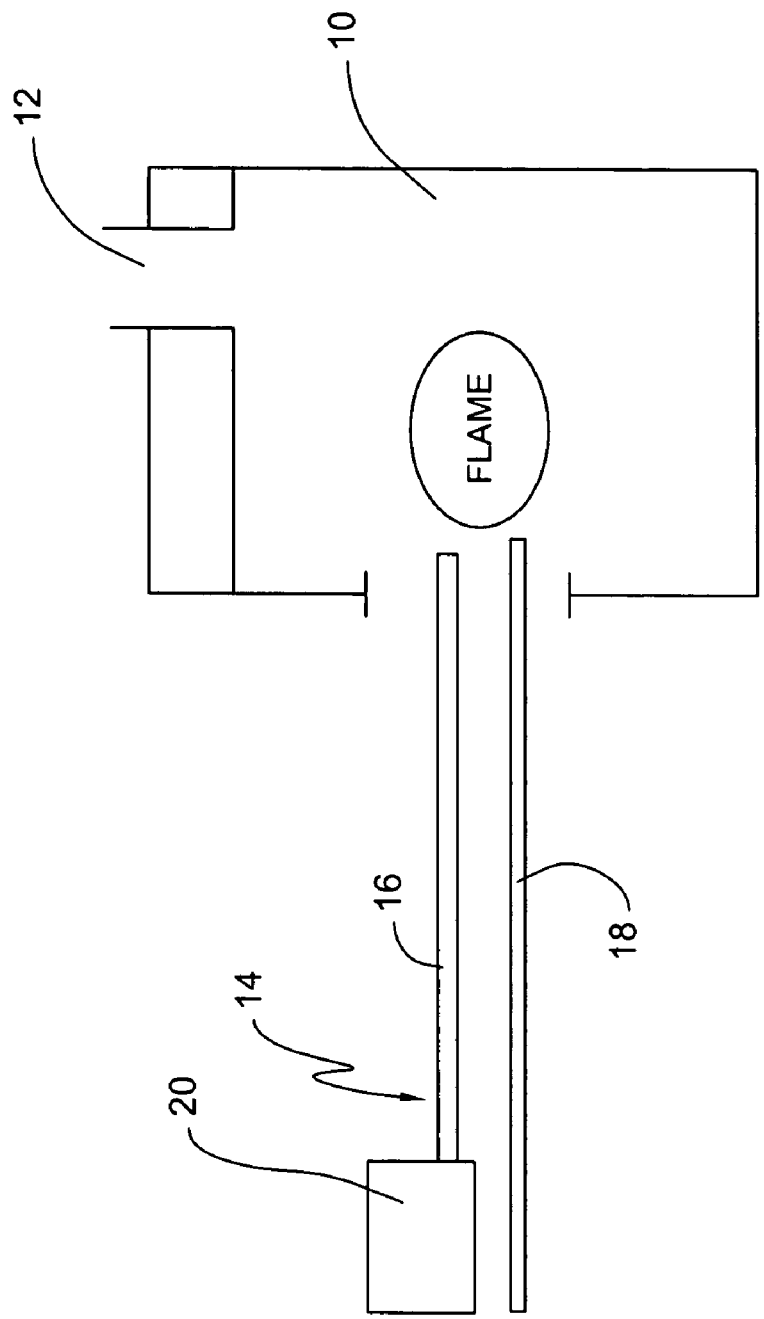
FIG. 1 shows a schematic view of exemplary techniques for inserting tires or parts of tires into a furnace for the manufacture of steel or other metals.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

The invention is generally depicted in FIG. 1, but may be embodied in various forms. As used herein, the term "tires" is to be broadly interpreted to include whole tires, tire pieces, parts, sections, bales, powder, particles, chunks, and the like. With the teachings and principles of the present invention, the term "tires" is also to be understood to encompass other types of rubber or rubber products, such as waste hoses, scrap rubber materials, rubber pieces, parts, sections, powder, particles, chunks, and the like, or any other similar product or material that is suitable for use as carbon or fuel in a steel or metal making furnace.

Referring to FIG. 1, the invention includes a furnace 10 that has an opening 12 positioned above or in the roof of the furnace 10 for inserting tires, or parts of tires. The furnace 10 may be an arc furnace or any other furnace used for melting steel or metal. It should be understood that the invention is not limited to the type of furnace used for melting steel, that the teachings and principles of the invention may be applied to all types of furnaces that permit the use of tires as either fuel or a carbon source.

To transport to and place the scrap steel or metal into the furnace 10, a number of devices and techniques are possible. The device might be a conventional charging bucket that is filled with scrap steel and is moved to a location above the furnace where the contents can be emptied into the furnace. The device may include a conveyor that is used to convey the scrap steel directly into the furnace in a continuous or semi-continuous mode. A similar device includes a shaft that is filled with scrap metal, and through gravity, the scrap metal moves toward and into the furnace. Typically, the previously mentioned conveyor and shaft have a dual purpose. The conveyor or shaft is enclosed and this enclosure is also used to provide a duct for the removal of the hot exhaust gases from the furnace operation. These hot gases come in contact with the steel or metal scrap to preheat the steel or metal scrap before it enters the furnace.

The aforementioned devices and techniques to transport and place the scrap steel or metal into the furnace 10 may also be used to transport and place the tires, or parts of tires, into the furnace 10 separately from the scrap steel or metal. That is, a conveyor may be used to transport and deposit the tires into the furnace 10, a charging bucket or box may be used to transport and charge the tires into the furnace, or a hopper may be located in proximity to the furnace 10 and used as a feeder to introduce the tires into the furnace 10.

Alternatively, the opening 12 in the furnace 10 roof or sidewall may be used to permit any size tire or fire bales or pieces of fires to be inserted or dropped into the furnace interior and at any desired time and rate so as to maximize the benefits of the melting and refining processes taking place within the furnace 10. The opening 12 can also include a chute to direct the tires into a desired position within the furnace 10. When used with a conveyor fed furnace such as Consteel®, the tires can be dropped into the furnace and the heat from the tires will be drawn through the Consteel® conveyor enclosure by the exhaust fans, thereby providing additional heat to the scrap metal on the conveyor. The fires can be added in a location opposite the conveyor opening to maximize the travel distance from the point of deposit to the conveyor entrance thus maximizing residence time in the furnace for best heat transfer to the scrap in the furnace but also to allow the fires sufficient time to more fully combust before the heat is drawn into the Consteel® enclosure to preheat the scrap. When used with a shaft furnace such as that manufactured by Fuchs, the tires would likewise be deposited to fully maximize the combustion and to gain contact time with the scrap in the furnace. In some instances, it is advantageous to combust the tires alone, prior to adding the scrap steel. This heat energy is drawn through the scrap metal in the shaft or the feeding conveyor, thus preheating it before it is moved into the furnace proper.

As another exemplary alternative, a pneumatic powered gun 14 may be used to put the fires into the furnace 10. In this embodiment, the tires are in a granulated or powdered form or suitable pieces and are blown through a tube or pipe 16 and into the furnace 10. The gun 14 can use compressed air or other gases to propel the tires or tire pieces through the pipe 16. Alternatively, the gun 14 may simply be a tube for inserting the tires and tire pieces into the furnace 10. The gun could be used through the door to "cut in" scrap like a conventional carbon lance and also to provide the added benefit of CO conversion. In a similar fashion, tire pieces can be used to augment or replace carbon in the sidewall burners found in most electric arc furnaces to gain the advantages accruing from the use of tires in place of coal.

The gun 14 can also function as a burner, with the tires or tire pieces serving as the fuel and using air and/or oxygen for combustion. In this embodiment, the tires serve as an additional energy source for the furnace 10. The air can be conveyed by the same pipe as the tires or by a separate pipe 18, as would likely be the case if oxygen were used to promote or enhance the combustion of the tires.

Yet another alternative device or technique for inserting the tires into the furnace 10 includes the use of a thrower device to throw the desired amount of tires into the opening 12 in the furnace 10, or through a door or other suitable opening (not shown). The thrower device would be used as an alternative to the gun in the situations where the tire pieces were not suitable for gunning into the furnace because of the size or shape of the pieces, or if the tires contained wire or bead materials from the tires that were interfering with the operation of the gun. The thrower device may be configured to work in conjunction with the specific size and configuration of tires being used. That is, the thrower device may be configured to accommodate any size tire or combination of tire sizes, along with any size of tire particles, large or small.

By adding the tires separately to the furnace 10, the conventional technique of first combining the metal scrap and the tires, and then putting the combined metal scrap and tires into the furnace is eliminated, thus saving time, effort, and resources. Moreover, this allows the tires to be added separately and directly to the furnace 10 in controlled quantities and at the correct time and location inside of the furnace to obtain maximum benefit. Also more space is created in the charging buckets for additional scrap metal.

More particularly, the objective in operating the furnace is to add energy at the maximum rate possible without causing damage to the furnace, or wasting energy that cannot be absorbed by the scrap metal quickly enough. This is desirable because of the large energy losses that occur to the water cooled furnace walls and roof and also to the furnace fume exhaust duct, combustion chamber, and dust collector. The longer the time taken to bring the scrap to tapping temperature, and/or holding at this temperature, the greater the heat losses. Because of the heat lost through radiation, equipment water cooling, and exhaust gases, the amount of total heat lost is proportional to the time spent in heating the scrap to molten temperature and holding at this temperature before tapping. The higher the rate of heat input, the lower the heat lost to the surroundings because of the time factor. Through the modulated, controlled, insertion of tires to the furnace, separate from the scrap steel, the heat lost is better controlled.

Apart from the heat lost, the cost of energy is also a major consideration, with electricity the most expensive, followed by natural gas, coke, coal and finally scrap tires, which have a negative cost (because they provide a disposal fee for consuming them along with some gain in the scrap steel which they contain). By replacing the traditional heat sources, such as electricity, with scrap tires, significant cost savings can be achieved. More specifically, the cost of electricity is highest at the early stages of the melting cycle because this is the time when the maximum amount of energy can be transferred to the scrap because it is cold and can accept heat more readily and also because the electric arc is shielded by the scrap, reducing damage to the furnace walls and roof. There is a power company "demand charge" for this rapidly consumed electrical energy—a charge that is established by the maximum rate of electrical power used during perhaps a fifteen-minute period in perhaps a twelve-month cycle. Different power companies have differing schedules. With the technique of applying the tires to the furnace separately from the scrap steel, this is also the time when the energy from the scrap tires can be used to reduce the demand charges and replace all or part of the electrical energy consumed during the initial and early stages of the melting cycle, while the scrap is still solid and relatively cold and able to accept the energy from the tire flames as it passes through the scrap. Thus, the use of a modulated, controlled, throttled flow of energy from the tires to replace electricity, (as well as gas, coke or coal) can result in significant cost savings.

Tire energy can be the major source of energy in the early stages of the heating cycle, with natural gas consumption then in a reduced rate and electricity gradually increased as the cycle progress but at a diminished rate at the beginning stages of the heat to save on demand charges. As the scrap metal is turned to molten metal the amount of energy that can be added to the metal bath from sources other than electricity is decreased because the liquid bath surface tends to reflect energy rather than absorb it. Also the bath is protected and covered by the insulating effects of the foamy slag. The solid tire parts can be dropped into or added to the bath, however, increasing carbon content or reacted with oxygen for additional energy in the bath.

The trend in this industry is to reduce electrical energy by adding more chemical energy in the form of natural gas burners and coal because it is cheaper. There are differences in the equipment being used and the melting practices followed, so the results vary from mill to mill. It is clear however, that low cost chemical energy is a very desirable commodity. It should therefore be appreciated that scrap tires clearly supply this need. The rate of energy added to the furnace by electricity, natural gas or coal injection is controlled. The rate of tire energy input needs to be controlled for the same reasons. This further allows the rate of energy release to be reduced so that the tires are not burning at a less controlled rate and consumed before the steel scrap can capture the available heat energy, as can occur if the tires are bundled with the scrap steel prior to insertion into the furnace.

Also, in another aspect of the invention, with the use of tires separate from the scrap steel, the other forms of energy being applied to the furnace may be reduced or regulated in a more precise and controlled manner. As indicated above, these energy inputs are usually natural gas or fuel oil with combustion air or oxygen, electricity, coal or coke. These other energy inputs into the furnace can be more precisely adjusted to correspond to the rate of tire energy input since the tire energy can now be controlled at a desired rate, as opposed to the known techniques of batch feeding the tires with scrap steel. In this invention, the tire energy is the primary source with the other energies filling the gaps not taken care of by tire energy.

Because the tires enhance the conversion of carbon monoxide to carbon dioxide, the tires can be injected into the furnace slag area in a location where this conversion can be most beneficial. The slag having been made from the addition of lime and/or other slag forming materials having the desired flux and foaming properties. The tire injection location is chosen so that the carbon monoxide released from the foamy slag can be converted to carbon dioxide before it enters, or while it is moving through the scrap metal. The carbon monoxide bubbles are formed in the slag by the use of a lance that injects carbon, usually coal particles, along with oxygen gas, directly or indirectly into the slag which is floating on the molten steel puddle in the bottom of the furnace vessel. The foamed slag is in contact with, and partially envelopes and engulfs the steel scrap above it. The carbon monoxide bubbles continually burst and this gas flows through the scrap metal and finally is exhausted out through an exhaust port, usually a hole the furnace roof, often referred to as a "fourth hole." A large percentage of the available energy in this gas is lost because it exits the furnace as CO rather than converting to $CO_2$. In one method of the invention, the tires or tire pieces would be added to the coal mix during, or prior to, injecting into the slag, or the tires may be added independently of the coal mix. The added tires facilitate the conversion from CO to $CO_2$. The ratio and timing may be adjusted to allow the slag to form CO and then convert to $CO_2$ after the foam had done its job, releasing the conversion energy while it was passing through the scrap metal, thus heating the scrap metal. In another method, the tire or tire pieces would be injected at a location above the slag but low in the scrap layer so there would be sufficient mixing time for the tire fume to react the CO to $CO_2$. While the tires or tire pieces are burning in the scrap metal zone in the furnace, the heat from this exothermic reaction has a chance to contact and transfer to the scrap as it passes through it, thereby improving the rate of melting of the scrap metal. In another method, the tires are used to replace substantially all of the coal for slag foaming. Thus saving the cost of the coal and assisting the CO conversion.

Similarly, the tires can be injected directly into the furnace while steel scrap is being fed by a shaft or conveyor system. The tires are burned in the furnace while the hot gases generated from the tire fire are withdrawn by the fume collection system. This hot exhaust is pulled through the enclosure surrounding the shaft or scrap conveyor, which causes it to be in close contact with the scrap metal. The hot gases will heat the metal as the gases move through the scrap in a counter-flow direction to the direction of travel for the scrap. This greatly enhances the purpose and value for having shaft or conveyor fed furnaces because the amount of available heat captured by them will be much greater. This also increases the efficiency of using tires because the contact time for the flames in these enclosures is even greater because the tires are gradually placed in the furnace so as to burn at a slower, controlled rate, giving the scrap metal more time to absorb the heat. This also allows any remnants of the CO to $CO_2$ conversion to take place in the shaft or conveyor enclosure before it escapes.

By using tires in forms other than whole tires some of the more valuable components of the fires can be removed before the residue from the tires is used for furnace feed. For example, crumb rubber particles have value as raw material for other products. The crumb rubber and other materials can be removed from the fires first, before the residue is used as a carbon, fuel and scrap metal source for steel or metal manufacturing, thus, increasing the value of the scrap tires and helping to convert them from a waste material to valuable assets.

Also, when the rubber material is removed from the tires the remaining tire material has a higher scrap metal content, which can increase its value as a charge material for the furnace. Additionally, having a higher metal content can permit the tire pieces to be handled with a scrap-handling magnet—a device typically found in steel scrap handling facilities and melt shops.

Injecting rubber from the tires directly into a hot furnace, separate from the scrap steel or metal, allows the rubber to be exposed to, and achieve a very high temperature almost instantaneously. This allows the rubber to be incinerated very rapidly with more complete combustion taking place inside of the furnace.

As stated above, the tires can be injected or placed directly into the metal bath so that the carbon from the tire is added directly to the metal. The tires provide a source of carbon, replacing coal or coke. The tires can be injected in controlled amounts so that the level of carbon in the bath can be more precisely adjusted according to the type or grade of steel being produced. This provides a more exact carbon level to be achieved in the finished product. The amount of tires that may be added may vary depending on the level of carbon required for the steel.

In summary, with various aspects of the present invention, the known step of combining the tires together with the metal scrap before introduction into the furnace is eliminated. The efficiency for the use of tires as an energy source is increased, since the energy is consumed gradually, instead of all at once with known batch-feeding techniques, and also the efficient use of the energy from the conversion of CO to CO2 is enhanced because the catalytic effect is not wasted in a rapid release from the furnace before it has time to act. A larger total quantity of tires can be converted to a useful function, greatly improving the environment. Total emissions from the process are improved on a more or less continuous basis. An emission "spike" is eliminated because of the more uniform application of the catalytic effect of the scrap tires. Also, other forms of energy now used in the furnaces can be reduced and replaced by scrap tire energy. With the principles and teachings of the invention, the production of many types of metal products including various steel alloys, iron alloys and the like can be improved.

The above described invention provides several advancements over the art in the use of tires, or parts of tires, as a fuel source for steel or other metal melting, and as a carbon component for the making of steel or other metals. First, the invention improves air emissions from steel melting. Second, the invention provides a way to convert additional waste materials, i.e., scrap tires or tire parts, to a valuable commodity. Third, the invention provides a method for increasing scrap tire consumption by the steel industry. Fourth, the invention eliminates the step of combining the scrap rubber from tires, or tire parts, with scrap metal prior to placing the scrap rubber in the furnace. Fifth, the invention provides a technique of injecting and placing the rubber into the furnace so that the rubber can be put into the furnace in the desired amounts, at the desired times, and in the best location. Sixth, the invention allows the use of the many forms of tires or scrap rubber, e.g., bales, pieces, crumbs, shredded pieces, and the like, as a feed for the furnace. Seventh, the invention allows the reduction of "electrical demand" charges and other electrical consumption charges. Eighth, the invention enhances the scrap preheating aspects of shaft and conveyor fed furnaces, such as Consteel® by increasing the energy for preheating as a result of burning the tires and/or increasing CO to CO2 conversion in the furnace or in the shaft or conveyor. Finally, the invention produces steel or other metals by injecting carbon directly into the liquid metal using scrap rubber as a carbon source for the steel whether the liquid metal is in the furnace or afterward when in the ladle. One skilled in the art will appreciate that the invention provides still other advancements over the art as it pertains to the use of tires, or parts of tires, as a fuel source for steel or other metal melting, and as a carbon component for the making of steel or other metals.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A method of using tires in the manufacture of steel comprising the steps of:
    applying a quantity of scrap metal into an electric arc furnace; and
    applying a quantity of tires to the furnace separate from the quantity of scrap metal, wherein the quantity of tires does not include added scrap metal, and wherein the quantity of tires are used as an energy source to melt the scrap metal.

2. The method of claim 1 wherein the quantity of tires is selected from the group consisting of whole tires, tire pieces, tire parts, tire sections, tire bales, tire powder, tire particles, and tire chunks.

3. The method of claim 1 wherein the step of applying a quantity of scrap metal into the electric arc furnace is performed before the step of applying a quantity of tires to the furnace.

4. The method of claim 1 wherein the quantity of tires is applied to a chosen location of a slag of material formed in the furnace at a chosen time to convert the carbon monoxide gas to carbon dioxide gas.

5. A method of increasing the consumption of tires used in the manufacture of steel comprising the steps of:
    depositing a quantity of scrap metal into an electric arc furnace; and
    depositing a quantity of tires into the furnace separate from the quantity of scrap metal and at a controlled rate, wherein the quantity of tires does not include added scrap metal; and
    wherein the quantity of tires are used as an energy source to melt the scrap metal, and
    whereby the quantity of tires provide a carbon source for the steel.

6. The method of claim 5 wherein the quantity of tires is selected from the group consisting of whole tires, tire pieces, tire parts, tire sections, tire bales, tire powder, tire particles, and tire chunks.

7. The method of claim 5 wherein the step of depositing a quantity of scrap steel into the electric arc furnace is performed before the step of depositing a quantity of tires.

8. The method of claim 5 wherein the quantity of tires is applied to a chosen location of a slag of material formed in the furnace at a chosen time to convert the carbon monoxide gas to carbon dioxide gas.

9. A method of improving the preheating of scrap metal in a shaft or conveyor fed furnace comprising the steps of:
    applying a quantity of scrap metal into a furnace;
    applying energy to the quantity of scrap metal in the furnace to commence the melting of the scrap metal and the forming of a slag of material; and
    applying a quantity of tires to the slag of material in the furnace, wherein the quantity of tires does not include added scrap metal, and wherein the quantity of tires are used as an energy source to melt the scrap metal.

10. The method of claim 9 wherein the quantity of tires is selected from the group consisting of whole tires, tire pieces, tire parts, tire sections, tire bales, tire powder, tire particles, and tire chunks.

11. The method of claim 10 wherein the step of applying a quantity of scrap metal into the furnace is performed before the step of applying energy to the quantity of scrap metal which is performed before the step of applying a quantity of tires to the slag of material.

12. A method of using tires in the manufacture of steel comprising the steps of:
applying a quantity of scrap metal into an electric arc furnace;
applying energy to the quantity of scrap metal in the furnace to commence the melting of the scrap metal and the forming of a slag of material; and
injecting a quantity of tires together with a quantity of coal into the slag of material in the furnace, wherein the quantity of tires does not include added scrap metal,
whereby the quantity of tires are used as an energy source for melting the scrap metal.

13. The method of claim 12 wherein the quantity of tires is selected from the group consisting of whole tires, tire pieces, tire parts, tire sections, tire bales, tire powder, tire particles, and tire chunks.

14. The method of claim 13 wherein the step of applying a quantity of scrap metal into the electric arc furnace is performed before the step of applying energy to the quantity of scrap metal which is performed before the step of injecting a quantity of tires and coal into the slag of material.

15. A method of using tires in the manufacture of steel comprising the steps of:
applying a quantity of scrap metal into an electric arc furnace;
applying energy to the quantity of scrap metal in the furnace to commence the melting of the scrap metal and the forming of a slag of material, the slag releasing carbon monoxide gas; and
applying a quantity of tires together with coal to a chosen location of the slag of material in the furnace at a chosen time, wherein the quantity of tires does not include added scrap metal,
whereby the quantity of tires and coal convert the carbon monoxide gas to carbon dioxide gas.

16. The method of claim 15 wherein the quantity of tires is selected from the group consisting of whole tires, tire pieces, tire parts, tire sections, tire bales, tire powder, tire particles, and tire chunks.

17. The method of claim 16 wherein the step of applying a quantity of tires and coal to the slag of material is provided through the use of a powered gun.

18. The method of claim 16 wherein the step of applying a quantity of tires and coal to the slag of material is provided through the use of a conveyor.

19. The method of claim 16 wherein the step of applying a quantity of tires and coal to the slag of material is provided through the use of a chute.

20. The method of claim 16 wherein the step of applying a quantity of tires and coal to the slag of material is provided through the use of a charge bucket.

21. A method of improving the preheating of scrap metal in a shaft or conveyor fed furnace comprising the steps of:
applying a quantity of scrap metal into a furnace;
applying energy to the quantity of scrap metal in the furnace to commence the melting of the scrap metal and the forming of a slag of material; and
applying a quantity of tires, through the use of a throwing device, to the melting scrap metal in the furnace, wherein the quantity of tires does not include added scrap metal,
whereby the quantity of tires are used as an energy source to melt the scrap metal.

22. The method of claim 21 wherein the quantity of tires is selected from the group consisting of whole tires, tire pieces, tire parts, tire sections, tire bales, tire powder, tire particles, and tire chunks.

23. The method of claim 22 wherein the step of applying a quantity of scrap metal into the furnace is performed before the step of applying energy to the quantity of scrap metal which is performed before the step of applying a quantity of tires to the melting scrap metal.

24. A method of improving the preheating of scrap metal in a shaft or conveyor fed furnace comprising the steps of:
applying a quantity of tires alone into a furnace;
applying energy to the quantity of tires in the furnace to commence the combustion of the tires, whereby heat from the combustion preheats a quantity of scrap metal; and
applying the quantity of scrap metal to the same furnace.

25. The method of claim 24 wherein the quantity of tires is selected from the group consisting of whole tires, tire pieces, tire parts, tire sections, tire bales, tire powder, tire particles, and tire chunks.

* * * * *